United States Patent
Woo et al.

(10) Patent No.: US 9,908,403 B2
(45) Date of Patent: Mar. 6, 2018

(54) MISFUELING PREVENTION DEVICE FOR VEHICLE

(71) Applicant: Hyundai Motor Company, Seoul (KR)

(72) Inventors: Ji Hoon Woo, Gyeonggi-do (KR); Bu Yeol Ryu, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/341,187

(22) Filed: Nov. 2, 2016

(65) Prior Publication Data

US 2017/0313177 A1 Nov. 2, 2017

(30) Foreign Application Priority Data

Apr. 29, 2016 (KR) .................. 10-2016-0052684

(51) Int. Cl.
| | |
|---|---|
| *B60K 15/04* | (2006.01) |
| *B67D 7/04* | (2010.01) |
| *B67D 7/34* | (2010.01) |
| *B67D 7/42* | (2010.01) |

(52) U.S. Cl.
CPC ........... *B60K 15/04* (2013.01); *B67D 7/04* (2013.01); *B67D 7/344* (2013.01); *B60K 2015/0461* (2013.01); *B67D 7/42* (2013.01)

(58) Field of Classification Search
CPC .......... B60K 2015/0483; B60K 15/04; B60K 2015/0461; B67D 7/04; B67D 7/344
USPC ................................................. 141/348–350
See application file for complete search history.

(56) References Cited

U.S. PATENT DOCUMENTS

| | | | | |
|---|---|---|---|---|
| 6,302,169 B1* | 10/2001 | Pulos | ........ | B60K 15/04 |
| | | | | 141/301 |
| 9,481,239 B2* | 11/2016 | Ryu | ........ | B60K 15/04 |
| 2012/0192994 A1* | 8/2012 | Hagano | ........ | B60K 15/04 |
| | | | | 141/379 |
| 2012/0279612 A1* | 11/2012 | Washio | ........ | B60K 15/04 |
| | | | | 141/350 |
| 2015/0069058 A1* | 3/2015 | Ryu | ........ | B60K 15/04 |
| | | | | 220/86.2 |

FOREIGN PATENT DOCUMENTS

| | | |
|---|---|---|
| EP | 1790517 A2 | 5/2007 |
| JP | 2008-265621 A | 11/2008 |
| JP | 2011-519774 A | 7/2011 |
| JP | 2015-074409 A | 4/2015 |
| KR | 10-2006-0091473 A | 8/2006 |
| KR | 10-1481343 B1 | 1/2015 |

(Continued)

*Primary Examiner* — Timothy L Maust
*Assistant Examiner* — Andrew StClair
(74) *Attorney, Agent, or Firm* — Mintz Levin Cohn Ferris Glovsky and Popeo, P.C.; Peter F. Corless

(57) ABSTRACT

A misfuelling prevention device for preventing inappropriate fuel from being added to a vehicle utilizes a diameter difference between a gasoline gun and a diesel gun in order to prevent misfuelling. The misfuelling preventing device is constructed such that when the diesel gun having a relatively larger diameter is inserted, a locking button is not pressed while a flapper is opened, whereas when the gasoline gun having a relatively smaller diameter is inserted, the locking button is pressed while the flapper is not opened. As a result, misfuelling of the vehicle with inappropriate fuel is fundamentally prevented.

9 Claims, 4 Drawing Sheets

(56) References Cited

FOREIGN PATENT DOCUMENTS

| KR | 10-1498490 B1 | 3/2015 | | |
|----|---------------|--------|---|---|
| KR | 10-1498491 B1 | 3/2015 | | |
| KR | 10-1500136 B1 | 3/2015 | | |
| WO | WO 2012049749 A1 * | 4/2012 | ............. | B60K 15/04 |

* cited by examiner

MISFUELING PREVENTION DEVICE FOR VEHICLE

CROSS-REFERENCE TO RELATED APPLICATION

This application claims under 35 U.S.C. § 119(a) the benefit of Korean Patent Application No. 10-2016-0052684, filed on Apr. 29, 2016 in the Korean Intellectual Property Office, the entire contents of which are incorporated herein by reference.

BACKGROUND

1. Technical Field

The present invention relates to a misfuelling prevention device for a vehicle, more particularly, to a misfuelling prevention device capable of preventing a vehicle from being filled with inappropriate fuel.

2. Description of the Related Art

Generally, a vehicle is provided with a fuel tank for storing fuel necessary for combustion in an engine. Fuel is supplied to the fuel tank through a fuel inlet disposed at an end of an oiling pipe of the fuel tank.

Fuel guns for injecting fuel into fuel inlets have different diameters depending on the type of fuel and, as such, the diameter of a gasoline gun for injecting gasoline is different from the diameter of a diesel gun for injecting diesel.

Typically, as the diameter of the diesel gun is larger than that of the gasoline gun, the diameter of the fuel inlet for a diesel vehicle is larger than that of the fuel inlet for a gasoline vehicle.

Due to a diameter difference of fuel guns and fuel inlets depending on gasoline or diesel, it is impossible to insert the diesel gun into the fuel inlet of the gasoline vehicle, whereas it is possible to insert the gasoline gun into the fuel inlet of the diesel vehicle. As a result, there may be occasions that gasoline is supplied to the diesel vehicle due to misfuelling.

For example, the diameter of the diesel gun is about 25 to 31 mm, and the diameter of the gasoline gun is about 19 to 21 mm.

Additionally, the diameter of the fuel inlet of the gasoline vehicle is about 22 mm and the diameter of the fuel inlet of the diesel vehicle is about 26 to 32 mm.

Accordingly, since the diesel gun cannot be inserted into the fuel inlet of the gasoline vehicle, and only the gasoline gun can be inserted into the fuel inlet of the gasoline vehicle, there is no problem of misfuelling in the case of the gasoline vehicle. However, since not only the diesel gun but also the gasoline gun can be inserted into the fuel inlet of the diesel vehicle, misfuelling may occur in the case of the diesel vehicle.

SUMMARY

Therefore, the present invention provides a new type of misfuelling prevention device for a vehicle, which uses the diameter difference between a gasoline gun and a diesel gun such that, when the diesel gun having a relatively larger diameter is inserted, a locking button is not pressed to allow opening of a flapper, whereas when the gasoline gun having a relatively smaller diameter is inserted, the locking button is pressed to prevent opening of the flapper, thereby fundamentally preventing inappropriate fuel from being supplied to the vehicle.

In accordance with one aspect of the present invention, the above and other objects can be accomplished by the provision of a misfuelling prevention device including an upper housing fixedly mounted at an inlet side of a fuel inlet, an inner housing mounted to be disposed at an inside of the fuel inlet and to be disposed at a lower part of the upper housing, a flapper having a pin structure, the flapper being mounted at one side of the inner housing, and the flapper configured to pivot downwardly to be opened due to contact with a fuel gun, and a unit for preventing the flapper from being opened, the unit including a locking button and a hinge stopper respectively disposed above and below the flapper to move in a linked manner through contact between the locking button and hinge stopper, the locking button movable up and down due to contact with the fuel gun, the hinge stopper configured to move horizontally due to movement of the locking button, and the hinge stopper being fitted in a stopper hole formed in the inner housing to prevent the flapper from pivoting.

In a preferred embodiment, the inner housing may engage with an inside of a spring fixed at the upper housing to be horizontally movable.

In another preferred embodiment, the locking button may include a circular plate disposed in parallel to the flapper above the flapper, and a bar extending from a lower surface of the circular plate and passing through the flapper to contact the hinge stopper below the flapper.

In still another preferred embodiment, the circular plate of the locking button may have a smaller diameter than an inner diameter of a diesel gun and larger than an inner diameter of a gasoline gun.

In yet another preferred embodiment, the hinge stopper may be engaged with a guide member formed at a lower surface of the flapper to be guided upon horizontal movement thereof, while being elastically supported by a hinge spring.

In still yet another preferred embodiment, in order to form a smooth contact relation between the locking button and hinge stopper, a contact part of the hinge stopper may have a curved surface so as to contact the locking button.

In another further preferred embodiment, upon downward movement of the locking button, the locking button may be accommodated in a seat groove formed in the upper surface of the flapper.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
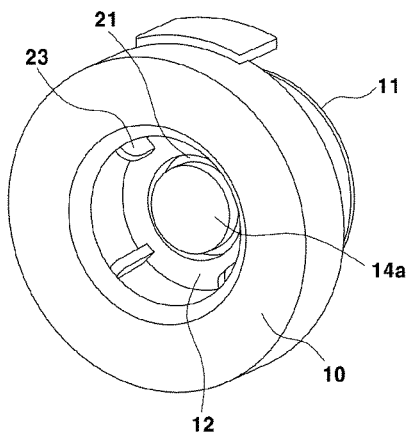
FIG. 1 is a perspective view illustrating an assembled state of components of a misfuelling prevention device according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the present invention will be described in detail with reference to the accompanying drawings to allow those skilled in the art to easily practice the present invention.

Figure 2:
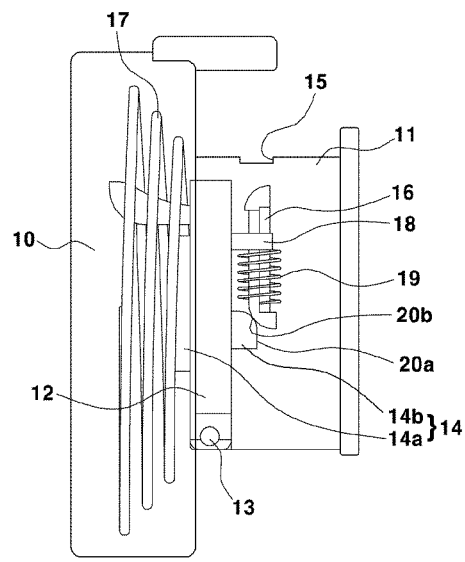
FIG. 2 is a perspective view illustrating an exploded state of the components of the misfuelling prevention device according to the illustrated embodiment of the present invention.
Figure 3:
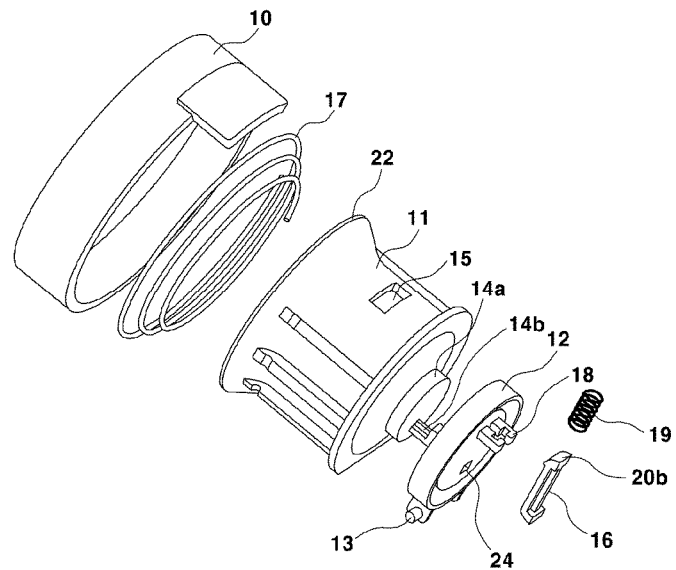
FIG. 3 is a sectional view illustrating an assembled state of the components of the misfuelling prevention device according to the illustrated embodiment of the present invention.

FIG. 1 is a perspective view illustrating an assembled state of components of a misfuelling prevention device according to an embodiment of the present invention. FIG. 2 is a perspective view illustrating an exploded state of the components of the misfuelling prevention device according to the illustrated embodiment of the present invention. FIG. 3 is a sectional view illustrating an assembled state of the components of the misfuelling prevention device according to the illustrated embodiment of the present invention.

As shown in FIGS. 1 to 3, the misfuelling prevention device has a structure capable of preventing inappropriate fuel from being supplied when injecting inappropriate fuel into a fuel gun, for example, when a gasoline gun is inserted into a fuel inlet of a diesel vehicle, by allowing or preventing opening of a flapper by selectively pressing or not pressing a locking button according to an inner diameter difference between the diesel gun and the gasoline gun.

To this end, the misfuelling prevention device includes a circular upper housing 10 fixedly mounted at an inlet side of a fuel inlet (not shown) and a cylindrical inner housing 11 disposed in the fuel inlet while being disposed at a lower part of the upper housing 10 to have a coaxial structure about the upper housing 10 and being configured to have a horizontally movable structure.

A plurality of fuel gun guide members 23 is provided at an inner circumferential surface of the inner housing 11 while being uniformly spaced apart from one another in a circumferential direction. Each fuel gun guide member 23 has an arc shaped inner upper end.

Accordingly, when the fuel gun is inserted, the fuel gun may be guided to a central part of the inner housing 11 by contact guidance of the fuel gun guide members 23.

In this case, an inner diameter defined by the fuel gun guide members 23 may be similar to an outer diameter of the diesel gun. As a result, upon insertion of the diesel gun, there may be no tilting of the diesel gun.

For example, when the outer diameter of the diesel gun is 23.8 mm, the inner diameter defined by the fuel gun guide members 23 may be set to 23.9 mm.

Additionally, a funnel part 22 is formed at an upper part of the inner housing 11 and, as such, the inner housing 11 is mounted to be supported by the upper housing 10 using the funnel part 22.

For example, a conical spring 17 is provided, and an upper part of the spring 17 is fixed inside of the upper housing 10 while the funnel part 22 of the upper part of the inner housing 11 is engageably fitted in an inner lower part of the spring 17.

Accordingly, the inner housing 11 is mounted in an engaged manner by the funnel part 22 having a diameter larger than a diameter of the lower part of the spring 17 and, as such, is prevented from falling downwards. The inner housing 11 may be horizontally movable in front/rear and left/right directions while spring resilience is applied to the inner housing 11.

A stopper hole 15 is formed through one side of a wall of the inner housing 11. A hinge stopper 16, which will be described below, may be engaged with the stopper hole 15. As a result, engagement between the stopper hole 15 and hinge stopper 16 prevents pivoting of a flapper 12, which will be described below.

Further, the misfuelling prevention device includes the flapper 12 having a function of opening or closing the inner housing 11 in order to allow or prevent supply of fuel.

The flapper 12 has a disk shape and is concentrically arranged at the inside of the inner housing 11. The flapper 12 is mounted at the wall of the inner housing 11 to be pivotable using a hinge 13 formed at one end of the flapper 12.

A one-way spring (not shown) is mounted at the hinge 13 of the flapper 12. When no external force is applied to the flapper 12, the flapper 12 always receives upward pivoting force from the spring, but lower parts of the fuel gun guide members 23 formed at the inner housing 11 are in contact with an upper surface of the flapper 12 to be caught, and as such, the flapper 12 returns to a horizontal position, thereby maintaining the inner housing 11 in a closed state.

That is, when the fuel gun for fueling is inserted, the flapper 12 pivots downwardly by the fuel gun, and as such, the inner housing 11 is opened. After fueling, when the fuel gun is taken out, the flapper 12 may return to a horizontal position by the spring force.

A circular seat groove 21 is formed at the upper surface of the flapper 12, and as such, the seat groove 21 may accommodate a locking button 14, particularly, a circular plate 14a of the locking button 14, which is movable downwards. A guide member 18 is formed at a lower surface of the flapper 12. The guide member 18 includes two bar-type structures extending vertically in parallel while being spaced apart from each other at a predetermined gap. Accordingly, the hinge stopper 16 may be disposed at the guide member 18 to be slidably engaged with the guide member 18 while being supported by the guide member 18.

Additionally, a bar hole 24 is formed to extend through the flapper 12 in a thickness direction. In this case, a bar 14b of the locking button 14 passes through the bar hole 24 to be slidable up and down.

Further, the locking button 14 and hinge stopper 16 included in the misfuelling prevention device are respectively disposed above and below the flapper 12 and move in a linked manner through contact therebetween Accordingly, the locking button 14 and hinge stopper 16 have a function of preventing the flapper 12 from being opened.

The locking button 14 moves up and down according to contact with the fuel gun, and as such, the hinge stopper 16 also moves. The locking button 14 also moves through the hinge stopper 16. The locking button 14 has an assembly structure of the circular plate 14a and bar 14b, for example, a structure in which an upper end of the bar 14b is coupled to a lower surface of the circular plate 14a in a fitted manner.

The circular plate 14a is horizontally arranged in parallel to the flapper 12 above the flapper 12. The bar 14b has an "L" shape, and extends from the lower surface of the circular plate 14a. The bar 14b passes though the bar hole 24 such that a free end thereof is disposed below the flapper 12. The bar 14b is in contact with the hinge stopper 16 by the free end of the bar 14b.

When the locking button 14 is pressed downwards, namely, the circular plate 14a is pressed downwards, the bar 14b integrated with the circular plate 14a also moves downwards, and as such, the hinge stopper 16 may be pushed to one side due to movement of the bar 14b.

In this case, the lower end of the bar 14b, namely, the free end, has a curved surface 20a having a convex-down arc shape and, as such, the bar 14b may have a smooth contact relation with the hinge stopper 16.

Particularly, the circular plate 14a of the locking button 14 may have a smaller diameter than the inner diameter of the diesel gun and larger than the inner diameter of the gasoline gun.

For example, when the inner diameter of the diesel gun is 19.8 mm and the inner diameter of the gasoline gun is 17.3 mm, an outer diameter of the locking button 14 may be smaller than 19.8 mm and larger than 17.3 mm, more preferably, may be 18 mm.

Accordingly, when the diesel gun is inserted, the locking button 14 may not be pressed, whereas when the gasoline gun is inserted, the locking button 14 may be pressed.

Further, the hinge stopper 16 is included in the misfuelling prevention device, in order to prevent the flapper 12 from pivoting while moving in a linked manner in accordance with movement of the locking button 14.

The hinge stopper 16 has a bar shape. As the hinge stopper 16 horizontally moves to be engaged with the stopper hole 15 of the inner housing 11, the hinge stopper 16 functions to prevent the flapper 12 from pivoting.

The hinge stopper 16 may be supported by the guide member 18 formed on the lower surface of the flapper 12 in a state of being engaged with the guide member 18 such that the hinge stopper 16 is guided by the guide member 18 upon horizontal movement thereof.

For example, as explained above, the guide member 18 includes the two bar-type structures which extend vertically in parallel while being spaced apart from each other at a predetermined gap, and as such, the hinge stopper 16 may be fitted between the two bar-type structures in a horizontal position.

In addition, lower ends of the two bar-type structures have an engagement structure, and as such, may prevent the hinge stopper 16 from being separated downwards.

Particularly, a hinge spring 19 having one side supported by a step of the hinge stopper 16 and the other side supported by the guide member 18, is mounted at a circumference of the hinge stopper 16.

Accordingly, the hinge stopper 16 may return to an initial position (a position at which the hinge stopper 16 is withdrawn from the stopper hole 15 of the inner housing 11) due to elastic restoring force of the hinge spring 19.

In the case of the hinge stopper 16, an outer end thereof has an upwardly convex curved surface 20b. Thus, the upwardly convex curved surface 20b of the hinge stopper 16 and the curved surface 20a of the locking button 14 may maintain a smooth contact relation therebetween.

Hereinafter, operation of the described misfuelling prevention device will be explained.

Figure 4A:
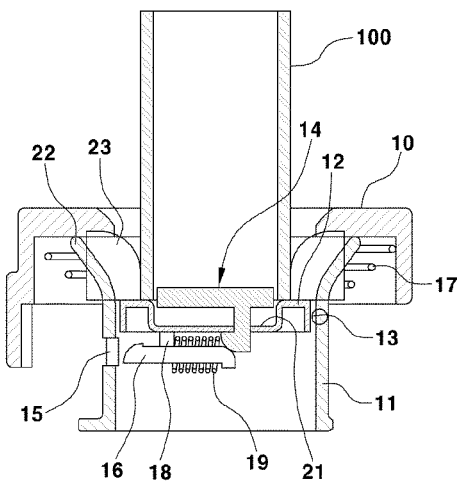
FIGS. 4A and 4B are sectional views illustrating an operation state when a diesel gun is inserted in the misfuelling prevention device according to the illustrated embodiment of the present invention.
Figure 4B:
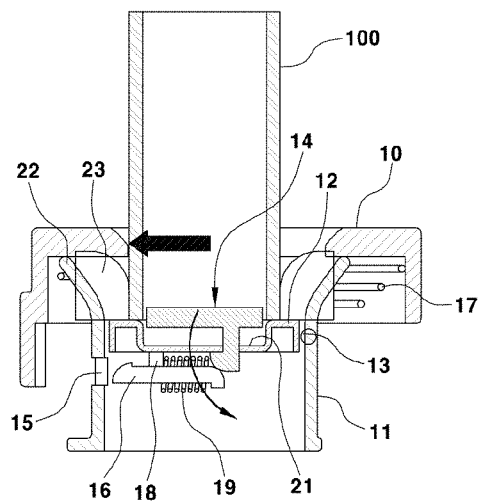

FIGS. 4A and 4B are sectional views illustrating an operation state when the diesel gun is inserted in the misfuelling prevention device according to the illustrated embodiment of the present invention.

As illustrated in FIGS. 4A and 4B, when the diesel gun 100 is inserted into the fuel inlet of the diesel vehicle, the locking button 14 is inserted into the diesel gun 100 because the diesel fuel gun 100 has an inner diameter of 19.8 mm and the locking button 14 has an outer diameter of 18 mm. In this case, accordingly, the locking button 14 is not pressed and, as such, the flapper 12 is opened. As a result, the diesel vehicle may be normally fueled with diesel fuel.

In this case, even when the diesel gun 100 is eccentrically inserted, the locking button 14 is not pressed due to movement of the inner housing 11 by the spring 17 and guidance of the fuel gun guide members 23.

Figure 5A:
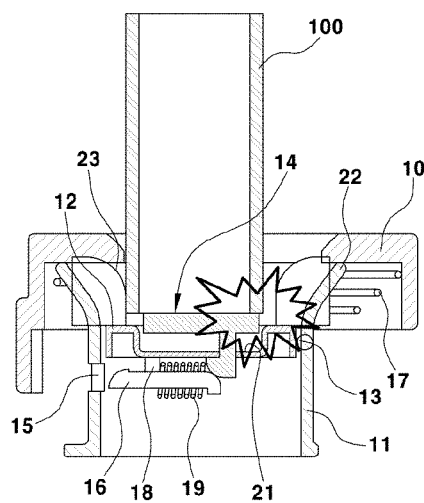
FIGS. 5A to 5C are sectional views illustrating an operation state when a gasoline gun is inserted in the misfuelling prevention device according to the illustrated embodiment of the present invention.
Figure 5B:
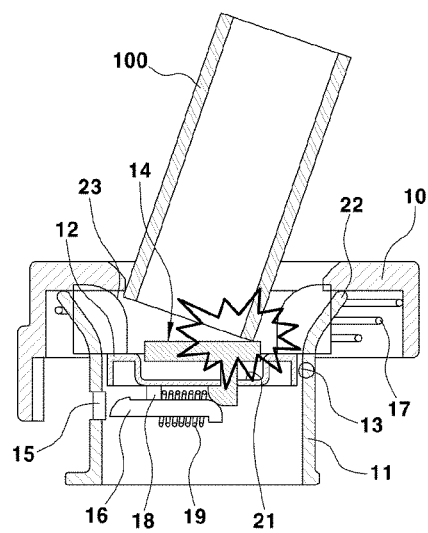
Figure 5C:
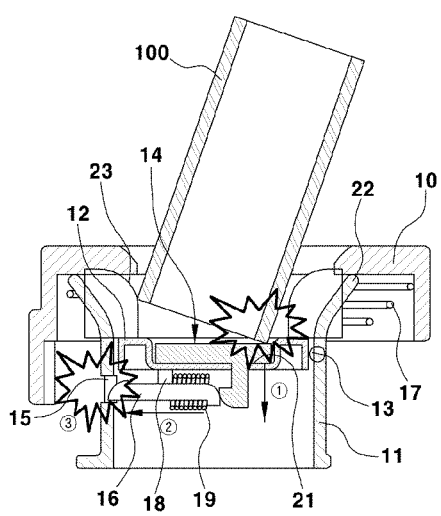

FIGS. 5A to 5C are sectional views illustrating an operation state when the gasoline gun is inserted in the misfuelling prevention device according to the illustrated embodiment of the present invention.

As illustrated in FIGS. 5A to 5C, when the gasoline gun is inserted into the fuel inlet of the diesel vehicle, the locking button 14 is pressed because the gasoline gun has an inner diameter of 17.3 mm and the locking button 14 has an outer diameter of 18 mm, that is, the outer diameter of the locking button 14 is larger than the inner diameter of the gasoline gun.

Additionally, even when the gasoline gun is eccentrically or slantingly inserted, as well as when being correctly inserted, the locking button 14 is pressed by the gasoline gun.

Accordingly, the locking button 14 moves downwards, and, at the same time, the hinge stopper 16 moves horizontally. The outer end of the hinge stopper 16 which moves horizontally, is fitted in the stopper hole 15 of the inner housing 11, and then downward movement of the flapper 12 is prevented, and, as such, the flapper 12 cannot be opened. As a result, misfuelling of the diesel vehicle with gasoline may be prevented.

As apparent from the above description, in accordance with the present invention, a new type misfuelling prevention device is provided. When a diesel gun having a relatively larger diameter is inserted, a locking button is not pressed and, as such, a flapper is opened, whereas when a gasoline gun having a relatively smaller diameter is inserted, the locking button is pressed and, as such, the flapper cannot be opened. Accordingly, in a case of insertion of an appropriate fuel gun, it is possible to fuel a vehicle, but in a case of insertion of an inappropriate fuel gun, it is impossible to fuel the vehicle, thereby fundamentally solving a problem of misfuelling.

Hereinafter, there are several effects in accordance with the misfuelling prevention device of the present invention.

First, the locking button operates selectively according to the diameter of the diesel gun or the gasoline gun and, as such, the flapper is selectively opened. Accordingly, misfueling of the diesel vehicle with inappropriate fuel, for example, gasoline fuel, may be fundamentally prevented.

Second, misfuelling may be prevented when the gasoline gun is inserted in eccentric or sloped manner.

Third, the misfuelling prevention device of the present invention has a structure in which the locking device is operated in accordance with the locking device being pressed by an inner diameter side of the fuel gun, unlike the conventional case in which the locking device is operated in accordance with engagement thereof with an outer diameter side of the fuel gun. Accordingly, the diameter for operation of the locking device is reduced and, as such, there is an advantage in terms of package size of the misfuelling prevention device. In addition, there are advantages of simple operation principle and simplification of constituent elements.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A misfuelling prevention device, comprising:
   an upper housing fixedly mounted at an inlet side of a fuel inlet;
   an inner housing mounted to be disposed at an inside of the fuel inlet and to be disposed at a lower part of the upper housing;
   a flapper having a hinge, the flapper being mounted at one side of the inner housing, and configured to pivot downwardly by the hinge to be opened due to contact with a fuel gun; and
   a unit for preventing the flapper from being opened, the unit comprising a locking button and a hinge stopper respectively disposed above and below the flapper to move in a linked manner through contact between the locking button and hinge stopper,
   wherein the locking button is configured to move relative to the flapper and move the hinge stopper into engagement with a stopper hole so as to prevent opening of the flapper, the locking button being positioned and sized to allow a standard diesel nozzle of the fuel gun to engage the flapper without pressing the locking button to allow the standard diesel nozzle to open the flapper.

2. The misfuelling prevention device according to claim 1, wherein the inner housing engages with an inside of a spring fixed at the upper housing to be horizontally movable.

3. The misfuelling prevention device according to claim 1, wherein the locking button comprises a circular plate disposed in parallel to the flapper and arranged above the flapper, and a bar extending from a lower surface of the circular plate and passing through the flapper to contact the hinge stopper below the flapper.

4. The misfuelling prevention device according to claim 3, wherein the circular plate of the locking button has a smaller diameter than an inner diameter of a standard diesel gun and a larger diameter than an inner diameter of a standard gasoline gun.

5. The misfuelling prevention device according to claim 1, wherein the hinge stopper is engaged with a guide member formed at a lower surface of the flapper to be guided upon horizontal movement thereof, while being elastically supported by a hinge spring.

6. The misfuelling prevention device according to claim 1, wherein the hinge stopper includes a contact part with a curved surface so as to contact the locking button.

7. The misfuelling prevention device according to claim 1, wherein upon downward movement of the locking button, the locking button is accommodated in a seat groove formed in an upper surface of the flapper.

8. The misfuelling prevention device according to claim 1, wherein the inner housing has an inner circumferential surface with a plurality of fuel gun guide members uniformly spaced apart from one another in a circumferential direction.

9. The misfuelling prevention device according to claim 8, wherein each of the fuel gun guide members has an arc shaped inner upper end.

* * * * *